(12) United States Patent
Gelbin et al.

(10) Patent No.: US 8,193,260 B2
(45) Date of Patent: *Jun. 5, 2012

(54) STABILIZATION OF POLYMERS WITH STYRENATED-P-CRESOLS

(75) Inventors: Michael E. Gelbin, Middlebury, CT (US); Jonathan S. Hill, Manchester (GB); Maurice Power, Manchester (GB)

(73) Assignee: Chemtura Corporation, Middlebury, CT (US)

( * ) Notice: Subject to any disclaimer, the term of this patent is extended or adjusted under 35 U.S.C. 154(b) by 607 days.

This patent is subject to a terminal disclaimer.

(21) Appl. No.: 12/069,631

(22) Filed: Feb. 11, 2008

(65) Prior Publication Data

US 2008/0207804 A1    Aug. 28, 2008

Related U.S. Application Data

(60) Provisional application No. 60/903,725, filed on Feb. 26, 2007, provisional application No. 60/931,954, filed on May 24, 2007, provisional application No. 60/936,918, filed on Jun. 21, 2007.

(51) Int. Cl.
*B29B 9/06* (2006.01)

(52) U.S. Cl. ........ 523/323; 524/114; 524/186; 524/147; 568/716

(58) Field of Classification Search .......... 524/114
See application file for complete search history.

(56) References Cited

U.S. PATENT DOCUMENTS

| | | | | |
|---|---|---|---|---|
| 1,906,935 A | | 5/1933 | Horst et al. ........... 525/153 |
| 1,975,167 A | | 10/1934 | Meuser ................ 528/225 |
| 2,002,642 A | | 5/1935 | Meuser et al. .......... 528/229 |
| 2,562,802 A | | 7/1951 | Mankowich et al. ...... 564/432 |
| 3,407,147 A | * | 10/1968 | Chew .................. 252/404 |
| 3,452,056 A | * | 6/1969 | Sundholm .............. 564/315 |
| 3,505,225 A | | 4/1970 | Wheeler ............... 508/497 |
| 3,523,083 A | | 8/1970 | DePierri, Jr. |
| 3,956,247 A | | 5/1976 | Landi et al. ........... 525/331.7 |
| 3,959,206 A | | 5/1976 | Singleton |
| 4,299,759 A | * | 11/1981 | Miyata et al. .......... 524/424 |
| 4,532,209 A | * | 7/1985 | Hagedorn ............. 435/156 |
| 5,140,055 A | | 8/1992 | Hirata et al. ........... 524/93 |
| 5,286,761 A | * | 2/1994 | Naujoks et al. ......... 521/172 |
| 5,466,740 A | | 11/1995 | Miyata ................ 524/399 |
| 5,844,029 A | | 12/1998 | Prabhu et al. .......... 524/236 |
| 5,880,191 A | | 3/1999 | Prabhu et al. .......... 524/236 |
| 5,922,794 A | | 7/1999 | Prabhu et al. .......... 524/236 |
| 6,103,798 A | | 8/2000 | Prabhu et al. .......... 524/236 |
| 6,242,562 B1 | | 6/2001 | Kobayashi et al. ....... 528/503 |
| 6,339,132 B1 | | 1/2002 | Kobayashi et al. ....... 526/68 |
| 6,391,065 B1 | | 5/2002 | Cooke ................. 8/442 |
| 2004/0096683 A1 | * | 5/2004 | Ikeda et al. ........... 428/500 |

FOREIGN PATENT DOCUMENTS

| | | |
|---|---|---|
| EP | 0 623 555 A1 | 11/1994 |
| EP | 0 774 539 A2 | 5/1997 |
| JP | 571287989 | 8/1982 |
| JP | 6025310 | 2/1994 |
| JP | 2006052421 | 2/2006 |

* cited by examiner

*Primary Examiner* — Doris Lee
(74) *Attorney, Agent, or Firm* — Joseph Suhadolnik

(57) ABSTRACT

Disclosed herein is a process for the preparation of a mixture of styrenated p-cresol species that is liquid at room temperature and has a viscosity of less than 40,000 cps at 25° C., wherein said process affords 2,6-distyrenated p-cresol assaying at 70% minimum by GC area percent, comprising reacting styrene with p-cresol at a molar ratio of 1.85 to 2.1:1, respectively, in the presence of an acid catalyst at elevated temperature, wherein said mixture comprises monostyrenated-p-cresol, distyrenated-p-cresol, and tristyrenated-p-cresol and exhibits an acid number of less than 0.1 mg KOH/gram.

27 Claims, No Drawings

STABILIZATION OF POLYMERS WITH STYRENATED-P-CRESOLS

I claim the benefit under Title 35, United States Code, §119 to U.S. Provisional Application No. 60/903,725, filed Feb. 26, 2007 entitled Stabilizer Composition Comprising 2,6 Di-Styrenated-p-Cresol; U.S. Provisional Application No. 60/931,954, filed May 24, 2007 entitled Low-Fogging Phenolic Antioxidant for Polyurethane Foam Products; and U.S. Provisional Application No. 60/936,918, filed Jun. 21, 2007 entitled Light Colored Styrenated p-Cresol Composition Liquid at Room Temperature.

BACKGROUND OF THE INVENTION

1. Field of the Invention

The present invention relates to the stabilization of polymers. More particularly, the present invention relates to the use of styrenated-p-cresols to stabilize polymeric compositions, preferably compositions comprising thermoplastic polymers or elastomers.

2. Description of Related Art

There is a continuing need for phenolic antioxidants having a liquid physical form in a number of polymer markets, such as thermoplastics, thermoelastomers, rubber, and oil additives. For many phenolic antioxidants, the liquid physical form can only be brought about by heating them to temperatures above their melting points. Examples include octadecyl-3,5-di-tert-butyl-4-hydroxycinnamate, the melting point of which is in the range from between 48° C. and 58° C., and 2,6-di-tert-butyl-p-cresol, whose melting point is approximately 69° C.

A major drawback associated with offering a compound that is solid at room temperature in its molten state, is that, in order to retain it in a liquid physical form, continued heating is required. In the field, however, heating is not always sustainable and, therefore, the molten product may cool and form a solid. Once solidified, it becomes all but impossible to transfer the compound out of its storage container, which may be necessary to convey it to the polymer to be stabilized. On the other hand, returning it to a liquid physical form requires re-heating, but re-melting a solid material in a closed container can be a laborious and drawn out process. Thus, the situation can lead to process delays, thereby adding unnecessary cost.

An additional problem can occur when the polymer employed is a polyurethane, especially foamed polyurethanes, which are commonly made from polyether polyols (polyols) and diisocyanates. The polyol component employed in the manufacture of such polyurethane foams normally contains antioxidants for improved stability and low color. Polyurethane-type foam products are commonly used in automotive interior applications, e.g. seating or dashboards, and there is a growing concern over the level of additives that may be emitted from plastics used in such applications. The phenomenon of additives being emitted from automotive interior plastics is sometimes known as fogging, as volatilized additives are known to deposit themselves on the inside of the windows of the automobile cabin. Once deposited, they may cause the windshield or other windows to fog up. The concern over automotive interior fog, however, is not simply a matter of safety owing to impaired visibility, but, rather, is also fueled by concern for the health of the car's occupants.

Thus, a need exists for the development of antioxidants or stabilizers having two key features for polyol stabilization: first, they must display low fog characteristics compared to industry standard controls, and second, they must either match or exceed the stabilizer efficiency of industry standards.

U.S. Pat. No. 3,956,247 discloses that the solution halogenation of EPDM (rubbery terpolymer of ethylene, an alpha mono-olefin, and a nonconjugated diene) in the presence of an epoxy compound, such as epoxidized soybean oil, with or without a poly(alkylene ether) glycol yields a halogenated EPDM of excellent viscosity stability and limited gel content. A mixture of two parts of nonylated phenyl phosphite and one part of styrenated-p-cresol can be employed as an antioxidant.

U.S. Pat. No. 5,140,055 discloses that a rubber composition containing a specifically limited imidazole compound or imidazoline compound, or benzimidazole or its specifically limited derivative has a large tan δ at high temperature range, and a tire having a tread using such rubber composition is prevented from being lowered in the value of tan δ due to the temperature rising during the running and has an improved grip performance during the high speed running. The use of Bronsted acid in combination with the imidazole, imidazoline or benzimidazole can obviate the drawback of poor scorch resistance of a rubber composition containing the imidazole, imidazoline or benzimidazole alone. The Bronsted acid to be used includes phenol derivatives, carboxylic acids, sulfonic acids, sulfuric acid and its derivatives, phosphoric acid and its derivatives, cyanuric acid and its derivatives, sulfinic acid, nitric acid and its derivatives, phosphorous acid and carbonic acid and its derivatives. Compounds listed as useful include 2,6-di-tert-butyl-p-cresol, 2,2'-methylenebis-4-methyl-6-tert-butylphenol, 4,4'-thiobis-3-methyl-6-tertbutylphenol, styrenated p-cresol, phosphoric acid, phosphoric acid esters, phosphorous acid, and phosphorous acid esters, among many others.

U.S. Pat. No. 5,466,740 discloses a halogen-containing resin composition made stable to heat and light, by incorporating (a) a calcium-based composite metal hydroxide and a calcium-based composite metal oxide, (b) a β-diketone compound or metal salt thereof, and optionally (c) an organic acid salt of zinc. The halogen-containing resin composition may contain conventional additives, such as organic tin stabilizers, epoxy stabilizers, phosphorous acid esters, sulfur-containing compound stabilizers, phenolic stabilizers, and antioxidants, e.g., styrenated p-cresol, 2,6-di-tert-butyl-4-methylphenol, butylated anisol, 4,4'-methylenebis (6-tert-butyl-3-methylphenol), 2,2'-methylenebis (6-tert-butyl-4-methylphenol), 1,3,5-trimethyl-2,4,6-tris(3,5-di-tert-butyl-4-hydroxybenzyl)benzene, and tetrakis [3-(4-hydroxy-3,5-di-tert-butylphenyl)propionyloxymethylene]methane.

U.S. Pat. No. 6,242,562 discloses a process for producing a vinyl chloride polymer that includes the steps of: (A) suspension polymerizing vinyl chloride or a monomer mixture containing vinyl chloride, in an aqueous medium to obtain a polymer slurry; (B) stripping unreacted monomers remaining in the polymer slurry; and (C) subjecting the polymer slurry having passed through the step (B), to dehydration at a temperature of from 80° C. to 95° C., preferably within 60 minutes after the stripping. More specifically, first, vinyl chloride or a monomer mixture containing vinyl chloride, an aqueous medium, a polymerization initiator and a dispersant are charged into a polymerization vessel, and a prescribed polymerization temperature (usually from 30 to 75° C.) is maintained with stirring to polymerize the vinyl chloride or the monomer mixture. At the time the polymerization has reached a prescribed degree (usually from 60 to 98%), the polymerization is terminated by, e.g., adding to the reaction mixture an antioxidant having a polymerization inhibitory action, e.g., phenol type antioxidants, such as styrenated p-cresol, among many others.

U.S. Pat. No. 6,339,132 discloses a process for regenerating unreacted vinyl chloride monomers including the step of compressing by means of a compressor an unreacted vinyl chloride monomer recovered from a process of vinyl chloride polymer production; and compressing the same in contact with a lubricating oil fed into the compressor. In this process, the lubricating oil contains a polymerization inhibitor having a polymerization inhibitory action to the vinyl chloride monomer. Such a polymerization inhibitor may be exemplified by phenol type inhibitors, such as styrenated p-cresol, among many others; amine type inhibitors; sulfur type inhibitors; and phosphorus type inhibitors, which can be used singly or in combination of two or more.

U.S. Pat. No. 6,391,065 discloses a water-dilutable UV light absorber composition and method for improving the lightfastness of dyed textiles. The composition is applied to the textiles and includes an ultraviolet light absorbing agent and an organic solvent suitable for dissolving the ultraviolet light absorbing agent. Example 5 of the patent discloses adding 10.0 g of benzyl-benzoate into 20.0 g "Naugard 529" liquid anti-oxidant/solvent (alkylated-styrenated p-cresol) to reduce viscosity.

SUMMARY OF THE INVENTION

It is an object of the present invention to provide phenolic antioxidants having a liquid physical form at room temperature.

It is another object of the present invention to provide phenolic antioxidants capable of acting as low fog additives when used in polyurethane-type foam formulations, while also imparting good stabilization.

It is another object of the present invention to provide a process for making 2,6-distyrenated-p-cresol assaying at 75% minimum, preferably, an assay range of from 80 to 90%.

It is another object of the present invention to provide a process for making 2,6-distyrenated-p-cresol having a viscosity of less than 40,000 cps at 25° C.

These and other objectives are achieved by the present invention, which is directed to a process for the preparation of a mixture of styrenated p-cresol species that is liquid at room temperature and has a viscosity of less than 40,000 cps at 25° C., wherein said process affords 2,6-distyrenated p-cresol assaying at 70% minimum by GC area percent, comprising reacting styrene with p-cresol at a molar ratio of 1.85 to 2.1:1, respectively, in the presence of an acid catalyst at elevated temperature, wherein said mixture comprises monostyrenated-p-cresol, distyrenated-p-cresol, and tristyrenated-p-cresol and exhibits an acid number of less than 0.1 mg KOH/gram.

In another aspect, the present invention is directed to a method for stabilizing a polymeric composition comprising including in said composition an effective amount of a mixture of styrenated p-cresol species that is liquid at room temperature and has a viscosity of less than 40,000 cps at 25° C., wherein said mixture is prepared by a process yielding 2,6-distyryl-p-cresol with an assay of 70% minimum by GC area and comprises reacting styrene with p-cresol at a molar ratio of 1.85 to 2.1:1, respectively, in the presence of an acid catalyst at elevated temperature, wherein said mixture comprises monostyrenated p-cresol, distyrenated-p-cresol, and tristyrenated p-cresol and exhibits an acid number of less than 0.1 mg KOH/gram.

In still another aspect, the present invention is directed to a composition comprising a mixture of styrenated p-cresol species that is liquid at room temperature, has a viscosity of less than 40,000 cps at 25° C., comprising 2,6-distyrenated p-cresol assaying at 70% minimum by GC area percent prepared by a process comprising reacting styrene with p-cresol at a molar ratio of 1.85 to 2.1:1, respectively, in the presence of an acid catalyst at elevated temperature, wherein said mixture comprises monostyrenated-p-cresol, distyrenated-p-cresol, and tristyrenated-p-cresol and exhibits an acid number of less than 0.1 mg KOH/gram.

DESCRIPTION OF THE PREFERRED EMBODIMENT(S)

As noted above, the present invention pertains to a process for preparing a styrenated p-cresol species that is a liquid at room temperature and its use as a stabilizer for polymeric compositions.

The styrenated p-cresol compositions employed in the practice of the present invention are prepared by reacting styrene with p-cresol at a molar ratio of from about 1.85:1 to about 2.1:1, respectively, at an elevated temperature in the presence of an acid catalyst to provide a mixture of styrenated p-cresol species. A preferred styrene:p-cresol molar ratio is 1.85 to 1.98:1, more preferably, 1.9 to 1.98:1, e.g. 1.95:1. Scheme 1 below depicts a typical reaction. The main product in the mixture is 2,6-di-styrenated-p-cresol (Di), assaying at 70%, preferably 75%, minimum by Gas Chromatography (GC) area. A more preferred GC area percentage of Di in the mixture is from about 80 to about 95%. The liquid physical form of the mixture is, further, achieved by incorporating the two additional reaction products, namely mono-styrenated-p-cresol (Mono, cf. Scheme 1) and tri-styrenated-p-cresol (Tri, see Scheme 1), in the resultant styrenated p-cresol composition. To achieve the desired liquid physical form, the Mono and Tri components should each be present at a level of no less than about 1% by GC area. A typical Mono component level is in the range of from about 1 to about 15% by GC area. A typical level for the Tri component is from about 1 to about 15% by GC area, as well. Preferably, the percentage of the combination of the Mono and Tri components will be in the range of from about 5 to about 30 percent by GC area, based on the total area of the Mono, Di, and Tri components.

Scheme 1
Typical Pathway for Making a Styrenated
p-Cresol Composition Liquid at Room Temperature

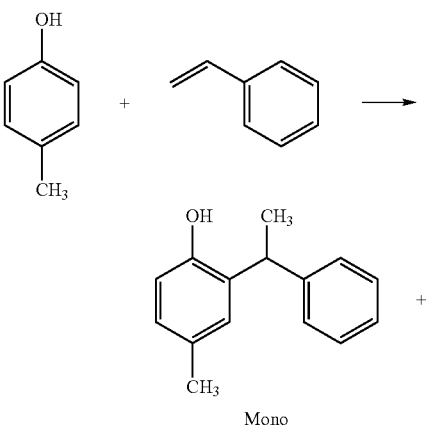

Mono

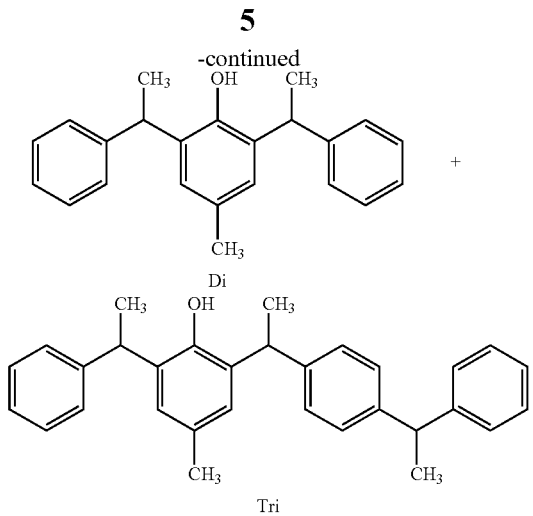

In the above reaction, the presence of a catalyst is required. Suitable catalysts typically have acidic properties, e.g., Brönsted acids or Lewis acids. However, some acid catalysts are known to impart a yellow color to styrenated p-cresol compositions, which may render them unsuitable for certain applications in which color is an important criterion. Examples of such catalysts include, but are not limited to, boron trifluoride etherate and sulfuric acid. For example, boron trifluoride etherate catalyst is known to give a product with an American Public Health Association (APHA) color index value of more than 150.

On the other hand, certain catalysts impart substantially no color. Thus, another preferred feature of the present invention is that the liquid styrenated p-cresol compositions can be prepared having very low color, if desired. A typical preferred APHA value for the liquid styrenated p-cresol compositions of the present invention is an APHA value of less than 150, preferably, an APHA value of less than 100. Examples of low color-producing catalysts in this context include, but are not limited to, trifluoromethane sulfonic acid and cation exchange resins.

Preferably, the reaction is run at a temperature in the range of from about 40° C. to about 150° C., more preferably in the range of from about 60 to about 80° C. The reaction time will normally be in the range of from about one to about seven hours, preferably, in the range of from about three to about four hours. If desired, the reaction can be run in a solvent that is inert thereto, which will preferably be a hydrocarbon, such as toluene, benzene, heptane, hexane, and the like.

EXAMPLE 1

Synthesis of 2,6-Distyryl-p-cresol—Typical Procedure

To a one liter round-bottomed flask equipped with a stirrer, thermometer, and addition funnel was charged 151.3 grams (1.4 moles) of p-cresol. The mixture was heated to 70° C., followed by the addition of 5 μL of trifluoromethane sulfonic acid via a 100 μL syringe. Under a nitrogen blanket, 284.5 grams (2.73 moles) of styrene was placed into the funnel and then added dropwise, with stirring, over a period of three hours. During styrene addition, the pot temperature did not exceed 80° C. Stirring was continued at a pot temperature of 70° C. for a period of 1.5 hours after all the styrene had been added. The resultant styrenated p-cresol composition analyzed as follows:

TABLE 1

| Gas Chromatography (GC) RESULTS (Area %) | |
|---|---|
| Styrene | 0.13 |
| p-Cresol | 0.03 |
| Monostyrenated p-cresol | 7.23 |
| 2,6-Distyrenated p-cresol | 86.31 |
| Tristyrenated p-cresol | 4.75 |
| Total Area | 98.45 |

APHA value=50
Acid Number=0.01 mg KOH/g
Brookfield Viscosity=29900 cps (25° C.)
Weight Yield=94%

Hereinafter, for convenience, the stabilizers employed in the practice of the present invention will be referred to simply as 2,6-distyryl-p-cresol; however, it should be understood that the actual product used was the mixture of Mono, Di, and Tri described above.

The invention further pertains to a stabilized thermoplastic or elastomeric resin, wherein one component comprises the 2,6-distyryl-p-cresol and the other a thermoplastic and/or elastomeric polymer, such as a polyolefin, polyvinyl chloride, SBR, nitrile rubber, and the like.

Thermoplastic polymers that can be stabilized by the 2,6-distyryl-p-cresol of the present invention may be any thermoplastic known in the art, such as polyolefin homopolymers and copolymers, polyesters, polyurethanes, polyalkylene terephthalates, polysulfones, polyimides, polyphenylene ethers, styrenic polymers and copolymers, polycarbonates, acrylic polymers, polyamides, polyacetals and halide-containing polymers. Mixtures of different polymers, such as polyphenylene ether/styrenic resin blends, polyvinyl chloride/ABS or other impact modified polymers, such as methacrylonitrile and alpha-methylstyrene containing ABS, and polyester/ABS or polycarbonate/ABS and polyester plus some other impact modifier may also be used. Such polymers are available commercially or may be made by means well known in the art. The stabilizers of the invention are particularly useful in polyolefins, polyurethanes, and halide-containing polymers.

Polymers of monoolefins and diolefins, for example polypropylene, polyisobutylene, polybutene-1, polymethylpentene-1, polyisoprene, or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example, mixtures of polypropylene with polyisobutylene, polypropylene with polyethylene (for example PP/HDPE, PP/LDPE) and mixtures of different types of polyethylene (for example LDPE/HDPE), may also be used. Also useful are copolymers of monoolefins and diolefins with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/isobutylene, ethylene/butane-1, propylene/butadiene, isobutylene, isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidene-norbornene; as well as mixtures of such copolymers and their mixtures with polymers mentioned above, for example polypropylene/ethylene propylene-copolymers, LDPE/EVA, LDPE/EAA, LLDPE/EVA, and LLDPE/EAA.

Halogen-containing polymers, e.g., PVC, may also be useful. As employed herein, the terms "poly(vinyl chloride)" and "PVC" are intended to include both homopolymers and copolymers of vinyl chloride, i.e., vinyl resins containing vinyl chloride units in their structure, e.g., copolymers of vinyl chloride and vinyl esters of aliphatic acids, in particular vinyl acetate; copolymers of vinyl chloride with esters of acrylic and methacrylic acid and with acrylonitrile; copolymers of vinyl chloride with diene compounds and unsaturated dicarboxylic acids or anhydrides thereof, such as copolymers of vinyl chloride with diethyl maleate, diethyl fumarate or maleic anhydride; post-chlorinated polymers and copolymers of vinyl chloride; copolymers of vinyl chloride and vinylidene chloride with unsaturated aldehydes, ketones and others, such as acrolein, crotonaldehyde, vinyl methyl ketone, vinyl methyl ether, vinyl isobutyl ether, and the like.

The terms "poly(vinyl chloride)" and "PVC" as employed herein are also intended to include graft polymers of PVC with EVA, ABS, and MBS. Preferred substrates are also mixtures of the above-mentioned homopolymers and copolymers, in particular vinyl chloride homopolymers, with other thermoplastic and/or elastomeric polymers, in particular blends with ABS, MBS, NBR, SAN, EVA, CPE, MBAS, PMA, PMMA, EPDM, and polylactones.

Vinyl acetate, vinylidene dichloride, acrylonitrile, chlorofluoroethylene and/or the esters of acrylic, fumaric, maleic and/or itaconic acids may be mentioned as preferred examples of monomers that are copolymerizable with vinyl chloride. In addition, polyvinyl chloride can be chlorinated having a chlorine content of up to 70% by weight. This invention applies particularly to the vinyl chloride homopolymers.

Within the scope of this invention, PVC will also be understood to include recyclates of halogen-containing polymers that have suffered damage by processing, use or storage.

The polymers may also include styrenic polymers, such as polystyrene, poly-(p-methylstyrene), poly-(α-methylstyrene), copolymers of styrene or α-methylstyrene with dienes or acrylic derivatives, such as, for example, styrene/butadiene, styrene/acrylonitrile, styrene/alkyl methacrylate, styrene/maleic anhydride, styrene/maleimide, styrene/butadiene/ethyl acrylate, styrene/acrylonitrile/methylacrylate, mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene styrene.

Styrenic polymers may additionally or alternatively include graft copolymers of styrene or α-methylstyrene such as, for example, styrene on polybutadiene, styrene on polybutadiene-styrene or polybutadiene-acrylonitrile; styrene and acrylonitrile (or methacrylonitrile) on polybutadiene and copolymers thereof; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene-propylene-diene terpolymers, styrene and acrylonitrile on polyacrylates or polymethacrylates, styrene and acrylonitrile on acrylate/butadiene copolymers, as well as mixtures thereof with the styrenic copolymers indicated above.

Nitrile polymers are also useful in the polymer composition of the invention. These include homopolymers and copolymers of acrylonitrile and its analogs, such as polymethacrylonitrile, polyacrylonitrile, acrylonitrile/-butadiene polymers, acrylonitrile/alkyl acrylate polymers, acrylonitrile/alkyl methacrylate/butadiene polymers, and various ABS compositions as referred to above in regard to styrenics.

Polymers based on acrylic acids, such as acrylic acid, methacrylic acid, methyl methacrylic acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Other useful polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene which contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acids and diols and/or from hydroxycarboxylic acids or the corresponding lactones, such as polyethylene terephthalate, polybutylene terephthalate, poly-1,4dimethylol-cyclohexane terephthalate, poly-2(2,2,4(4-hydroxyphenyl)-propane)terephthalate and polyhydroxybenzoates as well as block copolyetheresters derived from polyethers having hydroxyl end groups.

Polyamides and copolyamides which are derived from bisamines and dicarboxylic acids and/or from aminocarboxylic acids or the corresponding lactams, such as polyamide 4, polyamide 6, polyamide 6/6, 6/10, 6/9, 6/12 and 4/6, polyamide 11, polyamide 12, aromatic polyamides obtained by condensation of m-xylene bisamine and adipic acid; polyamides prepared from hexamethylene bisamine and isophthalic or/and terephthalic acid and optionally an elastomer as modifier, for example poly-2,4,4 trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols and polyamides or copolyamides modified with EPDM or ABS may be used.

Representative examples of suitable elastomeric polymers include solution styrene-butadiene rubber (SSBR), styrene-butadiene rubber (SBR), natural rubber (NR), polybutadiene (BR), ethylene-propylene co- and terpolymers (EP, EPDM), and acrylonitrile-butadiene rubber (NBR). The rubber composition is comprised of at least one diene-based elastomer, or rubber. Suitable conjugated dienes are isoprene and 1,3-butadiene and suitable vinyl aromatic compounds are styrene and α-methyl styrene. Thus, the rubber is a sulfur curable rubber. Such diene-based elastomer, or rubber, may be selected, for example, from at least one of cis-1,4-polyisoprene rubber (natural and/or synthetic, and preferably natural rubber), emulsion polymerization prepared styrene/butadiene copolymer rubber, organic solution polymerization prepared styrene/butadiene rubber, 3,4-polyisoprene rubber, isoprene/butadiene rubber, styrene/isoprene/butadiene terpolymer rubber, cis-1,4-polybutadiene, medium vinyl polybutadiene rubber (35 percent to 50 percent vinyl), high vinyl polybutadiene rubber (50 percent to 75 percent vinyl), styrene/isoprene copolymers, emulsion polymerization prepared styrene/butadiene/acrylonitrile terpolymer rubber and butadiene/acrylonitrile copolymer rubber. An emulsion polymerization derived styrene/butadiene (e-SBR) might be used having a relatively conventional styrene content of 20 percent to 28 percent bound styrene or, for some applications, an e-SBR having a medium to relatively high bound styrene content, namely, a bound styrene content of 30 percent to 45 percent. Emulsion polymerization prepared styrene/butadiene/acrylonitrile terpolymer rubbers containing 2 to 40 weight percent bound acrylonitrile in the terpolymer are also contemplated as diene-based rubbers for use in this invention.

The solution polymerization prepared SBR (S-SBR) typically has a bound styrene content in a range of 5 to 50 percent, preferably 9 to 36 percent. Polybutadiene elastomer may be conveniently characterized, for example, by having at least a 90 weight percent cis-1,4-content.

As used herein, by "stabilizing amount" or an "effective amount" of the stabilizers of the invention is meant when the polymer composition containing such stabilizers shows improved stability in any of its physical or color properties in comparison to an analogous polymer composition which does not include a phosphite of the invention. Examples of improved stability include improved stabilization against, for example, molecular weight degradation, color degradation, and the like from, for example, melt processing, weathering, and/or long term field exposure to heat, light, and/or other elements. In one example, an improved stability is meant one or both of lower initial color or additional resistance to weathering, as measured, for example, by initial yellowness index (YI), or by resistance to yellowing and change in color, when compared to a composition without the stabilizer additive.

The invention further relates to a stabilized thermoplastic and/or elastomeric resin, where one component comprises the 2,6-distyryl-p-cresol and the other a polymer such as those described above, and where the 2,6-distyryl-p-cresol is used with a co-stabilizer, for example, phenolics, aromatic amines, phosphites and phosphonites, hydroxylamines, alkylamine-N-oxides, lactones, thioethers, epoxidized vegetable oils, e.g., epoxidized oybean oil, and the like.

Thus, the thermoplastic resins stabilized by the 2,6-distyryl-p-cresol of the present invention may optionally contain an additional stabilizer or mixture of stabilizers selected from the group consisting of the phenolic antioxidants, hindered amine stabilizers, the ultraviolet light absorbers, phosphites, phosphonites, alkaline metal salts of fatty acids, the hydrotalcites, metal oxides, epoxydized soybean oils, the hydroxylamines, the tertiary amine oxides, lactones, thermal reaction products of tertiary amine oxides, and the thiosynergists. Phenolics, diaryl amines, and organophosphites are particularly preferred.

Phenolics that can be employed as optional co-stabilizers in the practice of the present invention include, but are not limited to:

1. Alkylated monophenols, for example: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6 dimethylphenol, 2,6-di-octadecyl-4-methylphenol, 2,4,6,-tricyclohexyphenol, 2,6-di-tert-butyl-4-methoxymethylphenol.

2. Alkylated hydroquinones, for example, 2,6-di-tert-butyl-4-methoxyphenol, 2,5-di-tert-butyl-hydroquinone, 2,5-di-tert-amylhydroquinone, 2,6-diphenyl-4-octadecyloxyphenol.

3. Hydroxylated thiodiphenyl ethers, for example, 2,2'-thio-bis-(6-tert-butyl-4-methylphenol), 2,2'-thio-bis-(4-octylphenol), 4,4'-thio-bis-(6-tert-butyl-3-methylphenol), 4,4'-thio-bis-(6-tert-butyl-2-methylphenol).

4. Alkylidene-bisphenols, for example, 2,2'-methylene-bis-(6-tert-butyl-4-methylphenol), 2,2'-methylene-bis-(6-tert-butyl-4-ethylphenol), 2,2'-methylene-bis-(4-methyl-6-(α-methylcyclohexyl(phenol), 2,2'-methylene-bis-(4-methyl-6-cyclohexylphenol), 2,2'-methylene-bis-(6-nonyl-4-methylphenol), 2,2'-methylene-bis-(6-nonyl-4-methylphenol), 2,2'-methylene-bis-(6-(α-methylbenzyl)-4-nonylphenol), 2,2'-methylene-bis-(6-(α,α-dimethylbenzyl)-4-nonyl-phenol), 2,2'-methylene-bis-(4,6-di-tert-butylphenol), 2,2'-ethylidene-bis-(6-tert-butyl-4-isobutylphenol), 4,4'-methylene-bis-(2,6-di-tert-butylphenol), 4,4'-methylene-bis-(6-tert-butyl-2-methylphenol), 1,1-bis-(5-tert-butyl-4-hydroxy-2-methylphenol)butane, 2,6-di-(3-tert-butyl-5-methyl-2-hydroxybenzyl)-4-methylphenol, 1,1,3-tris-(5-tert-butyl-4-hydroxy-2-methylphenyl)butane, 1,1-bis-(5-tert-butyl-4-hydroxy-2-methylphenyl)-3-dodecyl-mercaptobutane, ethyleneglycol-bis-(3,3,-bis-(3'-tert-butyl-4'-hydroxyphenyl)-butyrate)-di-(3-tert-butyl-4-hydroxy-5-methylphenyl)-dicyclopentadiene, di-(2-(3'-tert-butyl-2'hydroxy-5'methyl-benzyl)-6-tert-butyl-4-methylphenyl)terephthalate, and other phenolics such as mono-acrylate esters of bisphenols such as ethylidiene bis-2,4-di-t-butyl phenol monoacrylate ester.

5. Benzyl compounds, for example, 1,3,5-tris-(3,5-di-tert-butyl-4-hydroxybenzyl)-2,4,6-trimethylbenzene, bis-(3,5-di-tert-butyl-4-hydroxybenzyl)sulfide, isooctyl 3,5-di-tert-butyl-4-hydroxybenzyl-mercaptoacetate, bis-(4-tert-butyl-3-hydroxy-2,6-dimethylbenzyl)dithiol-terephthalate, 1,3,5-tris-(3,5-di-tert-butyl-4-hydroxybenzyl)isocyanurate, 1,3,5-tris-(4-tert-butyl-3-hydroxy-2,6-dimethylbenzyl) isocyanurate, dioctadecyl 3,5-di-tert-butyl-4-hydroxybenzyl-phosphonate, calcium salt of monoethyl 3,5-di-tert-butyl-4-hydroxybenzylphosphonate, 1,3,5-tris-(3,5-dicyclohexyl-4-hydroxybenzyl) isocyanurate.

6. Acylaminophenols, for example, 4-hydroxy-lauric acid anilide, 4-hydroxy-stearic acid anilide, 2,4-bis-octylmercapto-6-(3,5-tert-butyl-4-hydroxyanilino)-s-triazine, octyl-N-(3,5-di-tert-butyl-4-hydroxyphenyl)carbamate.

7. Esters of β-(3,5-di-tert-butyl-4-hydroxyphenol)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethyl isocyanurate, thiodiethyleneglycol, di-hydroxyethyl oxalic acid diamide.

8. Esters of β-(5-tert-butyl-4-hydroxy-3-methylphenyl)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethyl isocyanurate, thidiethyleneglycol, dihydroxyethyl oxalic acid diamide.

9. Esters of β-(5-tert-butyl-4-hydroxy-3-methylphenyl) propionic acid with mono- or polyhydric alcohols, e.g., with methanol, diethylene glycol, octadecanol, triethylene glycol, 1,6-hexanediol, pentaerythritol, neopentyl glycol, tris(hydroxyethyl)isocyanurate, thiodiethylene glycol, N,N-bis(hydroxyethyl)oxalic acid diamide.

10. Amides of β-(3,5-di-tert-butyl-4-hydroxyphenol)-propionic acid for example, N,N'-di-(3,5-di-tert-butyl-4-hydroxyphenylpropionyl)-hexamethylen-diamine, N,N'-di-(3,5-di-tert-butyl-4-hydroxyphenylpropionyl)trimethylenediamine, N,N'-di-(3,5-di-tert-butyl-4-hydroxyphenylpropionyl)-hydrazine.

Aromatic amines that are useful in the practice of the present invention can be represented by the general formula

where $R^1$ and $R^2$ may be, but are not necessarily, identical. Thus, in a preferred embodiment, $R^1$ and $R^2$ can be independently selected from the group consisting of (i) aromatic carbon, (ii) aliphatic $R^1$ and aromatic $R^2$ carbon atoms, and (iii) aromatic carbon linked to a second nitrogen atom to give a phenylene diamine.

Where $R^1$ is aliphatic, it can be straight chain or branched and can have from one to twelve carbon atoms, e.g., methyl, ethyl, propyl, butyl, pentyl, hexyl, heptyl, octyl, nonyl, decyl, undecyl, dodecyl, and isomers thereof. It is preferred that, where $R^1$ is aliphatic, it be a straight or branched chain aliphatic group having from one to eight carbon atoms, and more preferred that it have from one to four carbon atoms.

The amine antioxidants can be hydrocarbon substituted diarylamines, such as, aryl, alkyl, alkaryl, and aralkyl substituted diphenylamine antioxidant materials. A nonlimiting list of commercially available hydrocarbon substituted diphenylamines includes substituted octylated, nonylated, and heptylated diphenylamines and para-substituted styrenated or α-methyl styrenated diphenylamines. The sulfur-containing hydrocarbon substituted diphenylamines, such as p-(p-toluenesulfonylamido)-diphenylamine, i.e.,

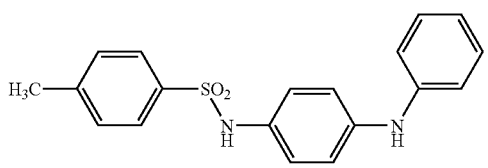

are also considered as part of this class.

Hydrocarbon-substituted diarylamines that are useful in the practice of this invention can be represented by the general formula

wherein Ar and Ar' are independently selected aryl radicals, at least one of which is preferably substituted with at least one alkyl radical. The aryl radicals can be, for example, phenyl, biphenyl, terphenyl, naphthyl, anthryl, phenanthryl, and the like. The alkyl substituent(s) can be, for example, methyl, ethyl, propyl, butyl, pentyl, hexyl, heptyl, octyl, nonyl, decyl, isomers thereof, and the like.

Preferred hydrocarbon-substituted diarylamines are those disclosed in U.S. Pat. Nos. 3,452,056 and 3,505,225—the disclosures of which are incorporated by reference herein. The preferred hydrocarbon-substituted diarylamines can be represented by the following general formulas:

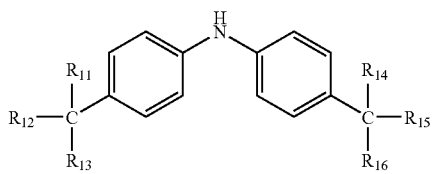

where
$R_{11}$ is selected from the group consisting of phenyl and p-tolyl radicals;
$R_{12}$ and $R_{13}$ are independently selected from the group consisting of methyl, phenyl, and p-tolyl radicals;
$R_{14}$ is selected from the group consisting of methyl, phenyl, p-tolyl, and neopentyl radicals;
$R_{15}$ is selected from the group consisting of methyl, phenyl, p-tolyl, and 2-phenylisobutyl radicals; and,
$R_{16}$ is a methyl radical.

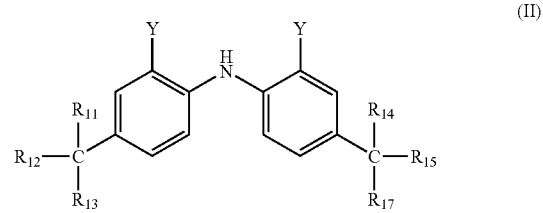

where
$R_{11}$ through $R_{15}$ are independently selected from the radicals shown in Formula I and $R_{17}$ is selected from the group consisting of methyl, phenyl, and p-tolyl radicals;
X is a radical selected from the group consisting of methyl, ethyl, $C_3$-$C_{10}$ sec-alkyl, α,α-dimethylbenzyl, α-methylbenzyl, chlorine, bromine, carboxyl, and metal salts of the carboxylic acids where the metal is selected from the group consisting of zinc, cadmium, nickel, lead, tin, magnesium, and copper; and,
Y is a radical selected from the group consisting of hydrogen, methyl, ethyl, $C_3$-$C_{10}$ sec-alkyl, chlorine, and bromine.

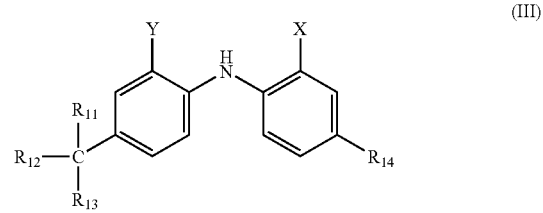

where
$R_{11}$ is selected from the group consisting of phenyl or p-tolyl radicals;
$R_{12}$ and $R_{13}$ are independently selected from the group consisting of methyl, phenyl, and p-tolyl radicals;
$R_{14}$ is a radical selected from the group consisting of hydrogen, $C_3$-$C_{10}$ primary, secondary, and tertiary alkyl, and $C_3$-$C_{10}$ alkoxyl, which may be straight chain or branched; and
X and Y are radicals selected from the group consisting of hydrogen, methyl, ethyl, $C_3$-$C_{10}$ sec-alkyl, chlorine, and bromine.

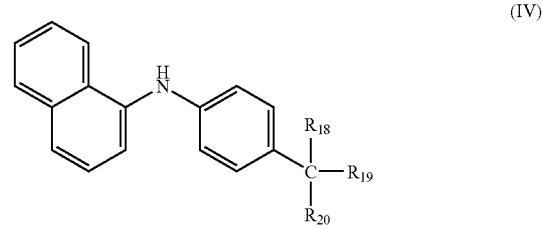

where $R_{18}$ is selected from the group consisting of phenyl and p-tolyl radicals;

$R_{19}$ is a radical selected from the group consisting of methyl, phenyl, p-tolyl and 2-phenyl isobutyl; and $R_{20}$ is a radical selected from the group consisting of methyl, phenyl, and p-tolyl.

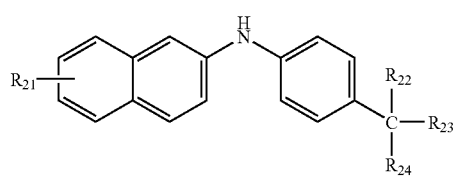

(V)

where $R_{21}$ is selected from the group consisting of hydrogen, α,α-dimethylbenzyl, α-methylbenzhydryl, triphenylmethyl, and α,αp-trimethylbenzyl radicals;

$R_{22}$ is selected from the group consisting of phenyl or p-tolyl radicals;

$R_{23}$ is selected from the group consisting of methyl, phenyl, and p-tolyl radicals; and $R_{24}$ is selected from the group consisting of methyl, phenyl, p-tolyl, and 2-phenylisobutyl radicals.

Typical chemicals useful in the invention are as follows:

TYPE I

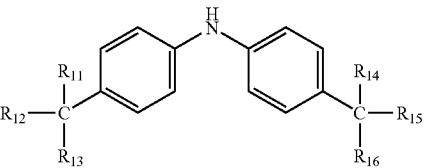

| $R_{11}$ | $R_{12}$ | $R_{13}$ | $R_{14}$ | $R_{15}$ | $R_{16}$ |
|---|---|---|---|---|---|
| Phenyl | Methyl | Methyl | Phenyl | Methyl | Methyl |
| Phenyl | Phenyl | Methyl | Phenyl | Phenyl | Methyl |
| Phenyl | Phenyl | Phenyl | Neopentyl | Methyl | Methyl |
| p-Tolyl | Methyl | Methyl | p-Tolyl | Methyl | Methyl |

TYPE II

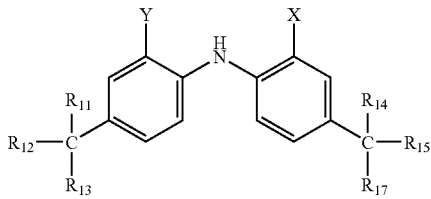

| $R_{11}$ | $R_{12}$ | $R_{13}$ | $R_{14}$ | $R_{15}$ | $R_{17}$ | X | Y |
|---|---|---|---|---|---|---|---|
| Phenyl | Methyl | Methyl | Phenyl | Methyl | Methyl | α,α-Dimethyl-benzyl | Hydrogen |
| Phenyl | Methyl | Methyl | Phenyl | Methyl | Methyl | Bromo | Bromo |
| Phenyl | Methyl | Methyl | Phenyl | Methyl | Methyl | Carboxyl | Hydrogen |
| Phenyl | Methyl | Methyl | Phenyl | Methyl | Methyl | Nickel carboxylate | Hydrogen |
| Phenyl | Methyl | Methyl | Phenyl | Methyl | Methyl | 2-Butyl | Hydrogen |
| Phenyl | Methyl | Methyl | Phenyl | Methyl | Methyl | 2-Octyl | Hydrogen |
| Phenyl | Phenyl | Phenyl | Phenyl | Phenyl | Phenyl | 2-Hexyl | Hydrogen |

TYPE III

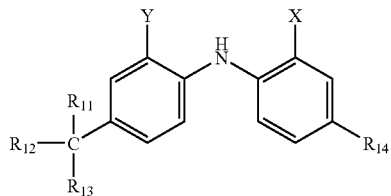

| $R_{11}$ | $R_{12}$ | $R_{13}$ | $R_{14}$ | X | Y |
|---|---|---|---|---|---|
| Phenyl | Methyl | Methyl | Isopropoxy | Hydrogen | Hydrogen |
| Phenyl | Methyl | Methyl | Hydrogen | 2-Octyl | Hydrogen |
| Phenyl | Phenyl | Phenyl | Hydrogen | 2-Hexyl | Hydrogen |

A second class of amine antioxidants comprises the reaction products of a diarylamine and an aliphatic ketone. The diarylamine aliphatic ketone reaction products that are useful herein are disclosed in U.S. Pat. Nos. 1,906,935; 1,975,167; 2,002,642; and 2,562,802. Briefly described, these products are obtained by reacting a diarylamine, preferably a diphenylamine, which may, if desired, possess one or more substituents on either aryl group, with an aliphatic ketone, preferably acetone, in the presence of a suitable catalyst. In addition to diphenylamine, other suitable diarylamine reactants include dinaphthyl amines; p-nitrodiphenylamine; 2,4-dinitrodiphenylamine; p-aminodiphenylamine; p-hydroxydiphenylamine; and the like. In addition to acetone, other useful ketone reactants include methylethylketone, diethylketone, monochloroacetone, dichloroacetone, and the like.

A preferred diarylamine-aliphatic ketone reaction product is obtained from the condensation reaction of diphenylamine and acetone (NAUGARD A, Chemtura Corporation), for example, in accordance with the conditions described in U.S. Pat. No. 2,562,802. The commercial product is supplied as a light tan-green powder or as greenish brown flakes and has a melting range of 85° to 95° C.

A third class of suitable amines comprises the N,N' hydrocarbon substituted p-phenylene diamines. The hydrocarbon substituent may be alkyl or aryl groups, which can be substituted or unsubstituted. As used herein, the term "alkyl," unless specifically described otherwise, is intended to include cycloalkyl. Representative materials are:

N-phenyl-N'-cyclohexyl-p-phenylenediamine;
N-phenyl-N'-sec-butyl-p-phenylenediamine;
N-phenyl-N'-isopropyl-p-phenylenediamine;

N-phenyl-N'-(1,3-dimethylbutyl)-p-phenylenediamine;
N,N'-bis-(1,4-dimethylpentyl)-p-phenylenediamine;
N,N'-diphenyl-p-phenylenediamine;
N,N'-di-beta naphthyl-p-phenylenediamine; mixed diaryl-p- N,N'-bis-(2-ethyl-3-methylpentyl)-p-phenylenediamines; and
N,N'-bis-(1 methylheptyl)-p-phenylenediamine.

A fourth class of amine antioxidants comprises materials based on quinoline, especially, polymerized 1,2-dihydro-2,2,4-trimethylquinoline (Naugard Super Q, Chemtura Corporation). Representative materials also include 6-dodecyl-2,2,4-trimethyl-1,2-dihydroquinoline; 6-ethoxy-2,2,4-trimethyl-1-2-dihydroquinoline, and the like.

Secondary amines that are especially preferred for use in the practice of the present invention are 4,4'-bis(α,α dimethylbenzyl)diphenylamine (Naugard 445, Chemtura Corporation), octylated diphenylamine (Naugard Octamine, Chemtura Corporation), polymerized 1,2-dihydro-2,2,4-trimethylquinoline (Naugard Super Q, Chemtura Corporation) and p-(p-toluene-sulfonylamido)-diphenyl amine (Naugard SA, Chemtura Corporation).

Phosphites and phosphonites useful as co-stabilizers in the practice of the present invention include, for example, triphenyl phosphite, diphenylalkyl phosphites, phenyldialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, tristearyl sorbitol triphosphite, and tetrakis(2,4-di-tert-butylphenyl)4,4'-biphenylene diphosphonite.

Lactones that can be employed as co-stabilizers in the practice of the present invention include those of the structure

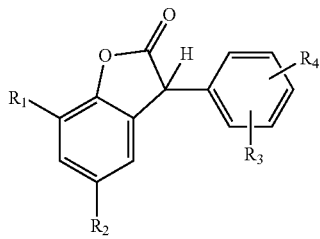

wherein $R_1$ and $R_2$ are independently selected from the group consisting of hydrogen; chloro; hydroxy; $C_1$-$C_{25}$ alkyl; $C_7$-$C_9$-phenylalkyl; unsubstituted or $C_1$-$C_4$ alkyl-substituted phenyl; unsubstituted or $C_1$-$C_4$ alkyl-substituted $C_5$-$C_8$ cycloalkyl; $C_1$-$C_{18}$ alkoxy; $C_1$-$C_{18}$ alkylthio; $C_1$-$C_4$ alkylamino; di-($C_1$-$C_4$ alkyl)amino; $C_1$-$C_{25}$ alkanoyloxy; $C_1$-$C_{25}$ alkanoylamino; $C_3$-$C_{25}$ alkenoyloxy; $C_3$-$C_{25}$ alkanoyloxy which is interrupted by oxygen, sulfur, or >N—$R_8$; $C_6$-$C_9$ cycloalkylcarbonyloxy; benzoyloxy or $C_1$-$C_{12}$ alkyl-substituted benzoyloxy;

$R_8$ is hydrogen or $C_1$-$C_8$ alkyl; and $R_3$ and $R_4$ are independently selected from the group consisting of hydrogen, $C_1$-$C_8$ alkyl, $C_1$-$C_4$ alkoxy, halogen, a group

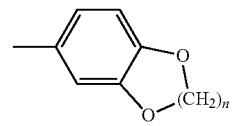

in which n is 1 or 2, or a group

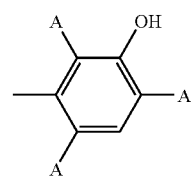

in which the radicals A are independently selected from the group consisting of $C_1$-$C_8$ alkyl and $C_1$-$C_8$ alkoxy.

One useful representative of these lactones is 5,7-di-t-butyl-3-(3,4,-dimethylphenyl)-3H-benzofuran-2-one, which is of the structure

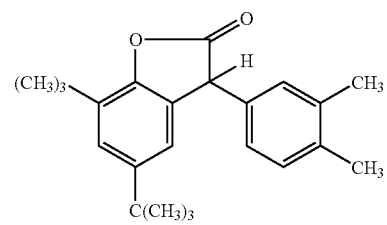

This compound is commercially available from Ciba Specialties as HP 136.

Thioethers that are useful as co-stabilizers in the practice of the present invention can be of the structure:

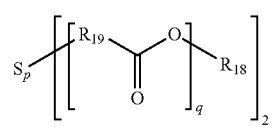

where p is 1 or 2, q is 0 or 1, and p+q=2, $R_{18}$ is a straight or branched chain alkyl moiety of 1 to 20 carbon atoms, and $R_{19}$ is a straight or branched chain alkylene moiety of 1 to 8 carbon atoms. Thus, $R_{18}$ can, for example, be methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and isomers thereof; and $R_{19}$ can, for example, be methylene, ethylene, propylene, butylene, pentylene, hexylene, heptylene, octylene, and isomers thereof. It is preferred that $R_{18}$ be a straight or branched chain alkyl moiety of 8 to 18 carbon atoms and that $R_{19}$ be a straight or branched chain alkylene moiety of 1 to 4 carbon atoms. It is more preferred that $R_{19}$ be ethylene, i.e., —$CH_2$—$CH_2$—.

Other thioethers that are useful in the practice of the present invention can be of the structure:

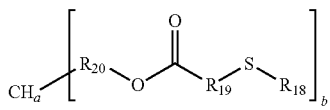

where a is 0 to 3, b is 1 to 4, and a+b=4, $R_{18}$ is as described above, and $R_{19}$ and $R_{20}$ are independently selected straight or branched chain alkylene moieties of 1 to 8 carbon atoms. It is preferred that $R_{19}$ and $R_{20}$ be independently selected straight or branched chain alkylene moieties of 1 to 4 carbon atoms. It is more preferred that $R_{20}$ be methylene, i.e., —$CH_2$—, and that $R_{19}$ be ethylene, i.e., —$CH_2$—$CH_2$—.

Preferred thioethers that are useful in the practice of the present invention are exemplified by products such as distearylthiodipropionate (Naugard DSTDP, Chemtura Corporation), dilaurylthiodipropionate (Naugard DLTDP, Chemtura Corporation), pentaerythritol tetrakis(β-laurylthiopropionate) (Naugard 412S, Chemtura Corporation), and pentaerythritol octylthiopropionate (Naugard 2140, Chemtura Corporation).

The optional co-stabilizer of the present invention can also be a trialkyl amine oxide, as, for example, GENOX™ EP (commercially available from Chemtura Corporation) and described in U.S. Pat. Nos. 6,103,798; 5,922,794; 5,880,191; and 5,844,029.

Another co-stabilizer may be a hydroxylamine, as, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dioctylhydroxylamine, N,N-di-tert-butylhydroxylamine, N-cyclohexylhydroxylamine, N-cyclododecylhydroxylamine, N,N-dicyclohexylhydroxylamine, N,N-didecylhydroxylamine, N,N-di(coco alkyl)hydroxylamine, N,N-di($C_{20}$-$C_{22}$ alkyl)hydroxylamine, and N,N-dialkylhydroxylamine derived from hydrogenated tallow amine (i.e., N,N-di(tallow alkyl)hydroxylamine), as well as mixtures containing any of the foregoing.

The resulting stabilized polymer compositions of the invention may optionally also contain various conventional additives, such as the following:

1. UV Absorbers and Light Stabilizers.
   1.1 2-(2'-hydroxyphenyl)-benzotriazoles, for example, the 5'-methyl-,3'5'-di-tert-butyl-,5'-tert-butyl-,5'(1,1,3,3-tetramethylbutyl)-,5-chloro-3',5'-di-tert-butyl-,5-chloro-3'-tert-butyl-5'-methyl-,3'-sec-butyl-5'-tert-butyl-,4'-octoxy,3',5'-di-tert-amyl-3',5'-bis-(α,α-dimethylbenzyl)-derivatives.
   1.2 2-Hydroxy-benzophenones, for example, the 4-hydroxy-4-methoxy-,4-octoxy,4-decloxy-,4-dodecyloxy-, 4-benzyloxy,4,2',4'-trihydroxy- and 2'-decyloxy-4, 4'-dimethoxy derivative.
   1.3 Esters of substituted and unsubstituted benzoic acids, for example, phenyl salicylate, 4-tert-butylphenyl-salicilate, octylphenyl salicylate, dibenzoylresorcinol, bis-(4-tert-butylbenzoyl)-resorcinol, benzoylresorcinol, 2,4-di-tert-butyl-phenyl-3,5-di-tert-butyl-4-hydroxybenzoate and hexadecyl-3,5-di-tert-butyl-4-hydroxybenzoate.
   1.4 Acrylates, for example, α-cyano-β, β-diphenylacrylic acid-ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyano-vinyl)-2-methyl-indoline.
   1.5 Nickel compounds, for example, nickel complexes of 2,2'-thiobis(4-(1,1,1,3-tetramethylbutyl)-phenol), such as the 1:1 or 1:2 complex, optionally with additional ligands such as n-butylamine, triethanolamine or N-cyclohexyl-diethanolamine, nickel dibutyldithiocarbamate, nickel salts of 4-hydroxy-3,5-di-tert-butylbenzylphosphonic acid monoalkyl esters, such as of the methyl, ethyl, or butyl ester, nickel complexes of ketoximes such as of 2-hydroxy-4-methyl-penyl undecyl ketoxime, nickel complexes of 1-phenyl-4-lauroyl-5-hydroxy-pyrazole, optionally with additional ligands.
   1.6 Sterically hindered amines, for example bis(2,2,6,6-tetramethylpiperidyl)-sebacate, bis-(1,2,2,6,6-pentamethylpiperidyl)-sebacate, n-butyl-3,5-di-tert-butyl-4-hydroxybenzyl malonic acid bis(1,2,2,6,6,-pentamethylpiperidyl)ester, condensation product of 1-hydroxyethyl-2,2,6,6-tetramethyl-4-hydroxy-piperidine and succinic acid, condensation product of N,N'-(2,2,6,6-tetramethylpiperidyl)-hexamethylendiamine and 4-tert-octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butanetetracarbonic acid, 1,1'(1,2-ethanediyl)-bis-(3,3,5,5-tetramethylpiperazinone). These amines typically called HALS include butane teracarboxylic acid 2,2,6,6-tetramethyl piperidinol esters. Such amines include hydroxylamines derived from hindered amines, such as di(1-hydroxy-2,2,6,6-tetramethylpiperidin-4-yl)sebacate; 1-hydroxy 2,2,6,6-tetramethyl-4-benzoxypiperidine; 1-hydroxy-2,2,6,6-tetramethyl-4-(3,5-di-tert-butyl-4-hydroxy hydrocinnamoyloxy)-piperdine; and N-(1-hydroxy-2,2,6,6-tetramethyl-piperidin-4-yl)-ε-caprolactam.
   1.7 Oxalic acid diamides, for example, 4,4'-dioctyloxy-oxanilide, 2,2'-di-octyloxy-5',5'-di-tert-butyloxanilide, 2,2'-di-dodecyloxy-5',5'-di-tert-butyl-oxanilide, 2-ethoxy-2'-ethyl-oxanilide, N,N'-bis(3-dimethylaminopropyl)-oxalamide, 2-ethoxy-5-tert-butyl-2'-ethyloxanilide and its mixture with 2-ethoxy-2'ethyl-5,4-di-tert-butyloxanilide and mixtures of ortho- and paramethoxy as well as of o- and p-ethoxy-disubstituted oxanilides.

2. Metal deactivators, for example, N,N'-diphenyloxalic acid diamide, N-salicylal-N'-salicyloylhydrazine, N,N'-bis-salicyloylhydrazine, N,N'-bis-(3,5-di-tert-butyl-4-hydrophenylpropionyl)-hydrazine, salicyloylamino-1,2,4-triazole, bis-benzyliden-oxalic acid dihydrazide.

3. Peroxide scavengers, for example, esters of β-thiodipropionic acid, for example, the lauryl, stearyl, myristyl, or tridecyl esters, mercaptobenzimidazole or the zinc salt of 2-mercaptobenzimidazole, zinc-dibutyldithiocaramate, dioctadecyldisulfide, pentaerythritoltetrakis-(β-dodecylmercapto)-propionate.

4. Polyamide stabilizers, for example, copper salts in combination with iodides and/or phosphorus compounds and salts of divalent manganese.

5. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, calcium stearoyl lactate, calcium lactate, Zn stearate, Mg stearate, Na ricinoleate and K palmitate, antimony pyrocatecholate or zinc pyrocatecholate, including neutralizers such as hydrotalcites and synthetic hydrotalcites, and Li, Na, Mg, Ca, and aluminum hydroxy carbonates.

6. Nucleating agents, for example, 4-tert butylbenzoic acid, adipic acid, diphenylacetic acid, sodium salt of methylene bis-2,4-dibutylphenyl, cyclic phosphate esters, sorbitol tris-benzaldehyde acetal, and sodium salt of bis(2,4-di-t-butyl phenyl)phosphate.

7. Fillers and reinforcing agents, for example, calcium carbonate, silicates, glass fibers, asbestos, talc, kaolin, mica, barium sulfate, metal oxides and hydroxides, carbon black and graphite.

8. The compounds of the present invention may also be used in conjunction with aminoxy propanoate derivatives, such as methyl-3-(N,N-dibenzylaminoxy)propanoate; ethyl-3-(N,N-dibenzylaminoxy)propanonoate; 1,6-hexamethylene-bis(3-N,N-dibenzylaminoxy)proponoate); methyl-(2-(methyl)-3(N,N-dibenzylaminoxy)propanoate); octadecyl-3-(N,N-dibenzylaminoxy)propanoic acid; tetrakis (N,N-dibenzylaminoxy)ethyl carbonyl oxymethy)methane; octadecyl-3-(N,N-diethylaminoxy)-propanoate; 3-(N,N-dibenzylaminoxy)propanoic acid potassium salt; and 1,6-hexamethylene bis(3-(N-allyl-N-dodecyl aminoxy)propanoate).

9. Other additives that may be employed in combination with the compounds of the present invention include, for example, plasticizers, epoxidized vegetable oils, such as epoxidized soybean oils, lubricants, emulsifiers, pigments, hydroxylamines, such as $R_2NOH$ wherein R is a $C_1$ to $C_{30}$ alkyl group, such as propyl or stearyl, optical brighteners, flameproofing agents, anti-static agents, blowing agents, and thiosynergists.

10. Nitrones, for example n-benzyl-α-phenyl nitrone, N-ethyl-α-methyl nitrone, N-octyl-α-heptyl nitrone, N-lauryl-α-undecyl nitrone, N-tetradecyl-α-tridecyl nitrone, N-hexadecyl-α-penta-decyl nitrone, n-octadecyl-α-heptadecylnitrone, N-hexadecyl-α-heptadecyl nitrone, N-octadecyl-α-pentadecy nitrone, N-heptadecyl-α-heptadecy nitrone, N-octadecyl-α-hexadecyl nitrone, and nitrone derived from N,N-dialkylhydroxylamine derived from hydrogenated tallow amine.

The additives and stabilizers described herein are preferably present in an amount effective to improve composition stability. When one of the aforementioned additives and stabilizers is utilized, the amount is generally less than about 5 weight percent based on the weight of the resin and is preferably at least about 50 ppm based on the weight of the resin. The stabilizer combinations of this invention stabilize resins especially during high temperature processing with relatively little change in melt index and/or color, even though the polymer may undergo a number of extrusions. The instant stabilizers may readily be incorporated into the resins by conventional techniques, at any convenient stage prior to the manufacture of shaped articles therefrom. The stabilized compositions of the invention may optionally also contain from about 0.001 to about 5%, preferably from about 0.0025 to about 2%, and especially from about 0.005% to about 1%, by weight of various conventional additives, such as those described previously, or mixtures thereof.

In the following examples, thermogravimetric analysis (TGA) on neat materials was performed using a Mettler Universal V2.5H TA instrument. Weight loss was recording by isotherming the test specimens at 160° C. under nitrogen.

Fog data were gathered by performing a test designated as Windscreen Fogging Characteristics of Trim Materials in Motor Vehicles on suitable polyurethane foam test specimens. The test method is also known as DIN 75 201 Method B. Di-isodecylphthalate (DIDP) was used as reference. Typically, the test calls for exposing test specimens at 100° C. for 16 hours.

Surprisingly, it has been found that the 2,6-distyryl-p-cresol of the present invention incorporates two key features when used in polyurethane-type foam formulations: (1) it acts as a low fog additive, while (2) also imparting good stabilization. As employed herein, the term "low fog" is defined as a fog deposit after heating for 160 hours at 100° C. in the range of from about 0.01 to about 0.4 mg, preferably from about 0.02 to about 0.1 mg.

The reasons for aforementioned surprise element are as follows:

neat 2,6-distyryl-p-cresol volatility was in line with its molar mass (MM); and a rule of thumb in the art holds that the lower the molar mass of a molecule, the higher is its volatility.

Thus, neat 2,6-distyryl-p-cresol (MM=316) is less volatile than neat 2,6-di tert-butyl-p-cresol (MM=220). At the same time, as suggested by their respective molar mass, 2,6-distyryl-p-cresol is more volatile than octadecyl 3,5-di-t-butyl-4-hydroxyhydrocinnamate (MM=531).

However, in polyurethane-type foam products the rule of thumb does not hold true. Thus, a formulation containing 2,6-distyryl-p-cresol gave much lower fog (i.e. volatility) than a corresponding formulation containing the higher molar mass additive, octadecyl 3,5-di-t-butyl-4-hydroxyhydrocinnamate.

Polyurethane type foam test specimens were prepared using the recipe below:

TABLE 2

| Material | Weight Percent |
| --- | --- |
| Polyol (Bayer LG56, 56 OH Index) | 100.0 |
| $H_2O$ | 4.4 |
| Dabco 8264 (Amine Catalyst) | 0.5 |
| L-620 (Silicone Surfactant) | 1.0 |
| Kosmos 29 (Tin Catalyst) | 0.28 |
| TDI (110 Index) | 56.77 |
| Antioxidant | 0.5 |

Differential Scanning Calorimetry (DSC) analysis was performed on a Mettler Toledo instrument. Oxidation Induction Temperature (OIT) was recorded as onset temperature on heating test specimens, under oxygen, from 30-300° C. using a heating rate of 8° C./min.

EXAMPLE 2

This example illustrates the volatility of neat 2,6-distyryl-p-cresol, as measured by TGA. The TGA results data are summarized in Table 3.

TABLE 3

TGA Volatility of Neat 2,6-Distyryl-p-Cresol

| Antioxidant (AO) | AO Molar Mass | Weight loss (%) after 1 hr. @ 160° C. | Weight loss (%) after 4 hrs. @ 160° C. |
| --- | --- | --- | --- |
| 2,6-di-tert-butyl-p-cresol | 230 | 100 | n.d. |
| 2,6-di-tert-butyl-4-sec-butyl phenol | 262 | 99 | n.d. |
| 2,6-di-styryl-p-cresol | 316 | 40 | 94 |

TABLE 3-continued

TGA Volatility of Neat 2,6-Distyryl-p-Cresol

| Antioxidant (AO) | AO Molar Mass | Weight loss (%) after 1 hr. @ 160° C. | Weight loss (%) after 4 hrs. @ 160° C. |
|---|---|---|---|
| C13-15 alkyl 3,5-di-tert-butyl-4-hydroxyhydrocinnamate | 471* | 8 | 20 |
| octadecyl 3,5-di-tert-butyl-4-hydroxyhydrocinnamate | 531 | 0.5 | 2.5 |

*estimated

These results show that neat additive volatility, as measured by TGA, line up with additive molar mass.

EXAMPLE 3

This example illustrates the volatiles emission from polyurethane foam additised with 2,6-distyryl-p-cresol, as measured by fog deposit. The fog test results data are summarized in Table 4.

TABLE 4

Fog Deposit of Polyurethane Foam Samples

| Antioxidant (AO) | AO Molar Mass | Fog deposit (mg) @ 160 hr./100° C. |
|---|---|---|
| None | | 0.04 |
| 2,6-di-tert-butyl-4-sec-butyl phenol | 262 | 0.71 |
| 2,6-di-styryl-p-cresol | 316 | 0.04 |
| C$_{13-15}$ alkyl 3,5-di-tert-butyl-4-hydroxyhydrocinnamate | 471* | 0.31 |
| octadecyl 3,5-di-tert-butyl-4-hydroxyhydrocinnamate | 531 | 0.35 |

*estimated

These results show a surprisingly low emission for polyurethane type foam samples additised with 2,6-distyryl-p-cresol. Thus, the total fog deposit value for a 2,6-distyryl-p-cresol formulation was comparable to the no-add control. In other words, fog deposit for this formulation was significantly lower than that of two control materials that each had a higher molar mass. Moreover, surprisingly, fog deposit did not line up with the order suggested by additive molar mass.

EXAMPLE 4

This example illustrates the polyol stabilizer efficacy of 2,6-di-styryl-p-cresol, as measured by Oxidation Induction Temperature. The results data are summarized in Table 5.

TABLE 5

OIT Results for Polyol Stabilized with 2,6-Distyryl-p-Cresol

| Polyol LG 56 (Bayer) + AO (1000 ppm) | OIT (° C.) |
|---|---|
| 2,6-di-tert-butyl-p-cresol | 173 |
| 2,6-di-tert-butyl-4-sec-butyl phenol | 179 |
| 2,6-di-styryl-p-cresol | 177 |
| C$_{13-15}$ alkyl 3,5-di-tert-butyl-4-hydroxyhydrocinnamate | 176 |
| octadecyl 3,5-di-tert-butyl-4-hydroxyhydrocinnamate | 175 |

These results from this testing showed the good stabilizing properties of 2,6-distyryl-p-cresol for polyol formulations, as measured by OIT. Several phenolic antioxidant controls were used in this testing.

EXAMPLE 5

Performance Evaluation of 2,6-distyrenated-p-cresol in LLDPE Retention of Melt Flow Index Upon Multipass Extrusion This example illustrates the stabilizer efficacy of 2,6-distyryl-p-cresol in the presence of a phosphite stabilizer, as compared to a control comprising a blend of octadecyl 3,5-di-t-butyl-4-hydroxyhydrocinnamate and a phosphite stabilizer.

The base polymer was a C4-copolymer linear low density polyethylene powder with a melt index (MI) of 1, having a density of 0.918 g/cm$^3$. The base formulation also contained 500 ppm of zinc stearate as an acid scavenger. All formulations were made up by adding tris nonylphenyl phosphite in combination with either 2,6-distyryl-p-cresol or octadecyl 3,5-di-t-butyl-4-hydroxyhydrocinnamate to the base formulation (see Table 6 for more details). The thus-stabilized resin formulation was then extruded from a 19 mm diameter Brabender single-screw extruder at 60 rpm, with the temperature set to 230° C. The first extrusion pass was performed under inert atmosphere. The extrudate was cooled by passing it through an ice water bath and then pelletized. These pellets were re-extruded, albeit under air, using the same RPM, temperature, and pelletizing conditions as before, for up to five additional passes. The results from this testing are shown in Table 6.

TABLE 6

MFI Results

| Stabilizer (ppm) | Extrusion Pass 1 MFI (g/10 min) @ 190/2.16 | Extrusion Pass 6 MFI (g/10 min @ 190/2.16) |
|---|---|---|
| Control: octadecyl 3,5-di-t-butyl-4-hydroxyhydrocinnamate (200) + P1 (1200) | 0.98 | 0.66 |
| 2,6-distyryl-p-cresol (200) + P1 (1200) | 1.01 | 0.94 |

P1 is tris(nonylphenyl) phosphite

A relatively small decrease in melt flow index is indicative of superior stabilizer efficacy. Thus, the results from this testing show that 2,6-distyryl-p-cresol, in combination with phosphite P1, gave superior melt stabilization as compared to the control.

EXAMPLE 6

This example illustrates the stabilizer efficacy of 2,6-distyryl-p-cresol, in the presence of a phosphite stabilizer, as determined by measuring retention of color. The result is compared to a control comprising a blend of octadecyl 3,5-di-t-butyl-4-hydroxyhydrocinnamate and the same phosphite stabilizer.

The base polymer was a C4-copolymer linear low density polyethylene powder with a melt index (MI) of 1, having a density of 0.918 g/cm$^3$. The base formulation also contained 500 ppm of zinc stearate as an acid scavenger. All formulations were made up by adding tris nonylphenyl phosphite in combination with either 2,6-distyryl-p-cresol or octadecyl 3,5-di-t-butyl-4-hydroxyhydrocinnamate to the base formulation (see Table 7 for additional details). The thus-stabilized resin formulation was then extruded from a 19 mm diameter Brabender single-screw extruder at 60 rpm, with the temperature set to 230° C. The first extrusion pass was performed under inert atmosphere. The extrudate was cooled by passing it through an ice water bath and then pelletized. These pellets were re-extruded, albeit under air, using the same RPM, temperature, and pelletizing conditions as before, for up to five additional passes. The results of this testing are shown in Table 7.

TABLE 7

Yellowness Results

| Stabilizer (ppm) | Extrusion Pass 1 Yellowness Index | Extrusion Pass 6 Yellowness Index |
| --- | --- | --- |
| Control: octadecyl 3,5-di-t-butyl-4-hydroxyhydrocinnamate (200) + P1 (1200) | −2.87 | 1.88 |
| 2,6-distyryl-p-cresol (200) + P1 (1200) | −2.39 | 1.18 |

P1 is tris(nonylphenyl) phosphite

A relatively small increase in yellowness index is indicative of superior stabilizer efficacy. Thus, the results of this testing show that 2,6-distyryl-p-cresol, in combination with phosphite P1, gave superior color retention as compared to the control.

EXAMPLE 7

Performance Evaluation of 2,6-Distyryl-p-Cresol in Styrene Butadiene Rubber Change in Mooney Viscosity Over Time During Oven Aging at 100° C.

This example illustrates the stabilizer efficacy of 2,6-distyryl-p-cresol both alone and in combination with a phosphite stabilizer, as compared to an unstabilized material (the control).

An e-SBR 1502 type resin was used. The coagulation agents were as follows: 7.5 mol % $H_2SO_4$ and 5 mol % $Al_2(SO_4)_3$ in water. e-SBR test specimens containing the stabilizer(s) shown in Table 8 were prepared and then placed in an oven at 100° C. for the oven aging experiments.

Mooney viscosities were measured on a viscTech Mooney viscometer from 30 gram samples (Temp: 100° C.; 1 min preheat time@ no rotation; measurement time 4 minutes after preheat). Mooney viscosity was measured on each formulation before oven aging, and then at regular intervals once the SBR test specimens had been exposed in the oven at 100° C. The results from this testing are shown in Table 8.

TABLE 8

Mooney Viscosity Results

| Stabilizer (phr) | Mooney viscosity (unaged) | Mooney viscosity after 14 days | Mooney viscosity After 21 days | Mooney viscosity After 42 days |
| --- | --- | --- | --- | --- |
| Control (none) | 63 | 120 | 124 | n.d. |
| 2,6-distyryl-p-cresol (1) | 38 | 72 | 75 | n.d. |
| 2,6-distyryl-p-cresol (0.2) + P1 (0.8) | 42 | 57 | 70 | 82 |

P1 is tris(nonylphenyl) phosphite

A relatively small increase in Mooney viscosity is indicative of superior stabilizer efficacy. Thus, the results of this testing show that 2,6-distyryl-p-cresol, both alone and in combination with phosphite P1, gave superior stabilization compared to the no-add control.

In view of the many changes and modifications that can be made without departing from principles underlying the invention, reference should be made to the appended claims for an understanding of the scope of the protection to be afforded the invention.

What is claimed is:

1. A process for the preparation of a mixture of styrenated p-cresol species that is liquid at room temperature and has a viscosity of less than 40,000 cps at 25° C., wherein said process affords 2,6-distyrenated p-cresol assaying at 70% minimum by GC area percent, comprising reacting styrene with p-cresol at a molar ratio of 1.85 to 2.1:1, respectively, in the presence of an acid catalyst at a temperature ranging from about 40° C. to about 150° C., wherein said mixture comprises monostyrenated-p-cresol, distyrenated-p-cresol, and tristyrenated-p-cresol and exhibits an acid number of less than 0.1 mg KOH/gram.

2. The process of claim 1 wherein said process affords 2,6-distyrenated p-cresol assaying in the range of from about 80 to about 90% by GC area percent.

3. The process of claim 1 wherein the acid number is less than 0.01 mg KOH/gram.

4. The process of claim 1 wherein the acid catalyst is a Bronsted or Lewis acid.

5. The process of claim 1 wherein the acid catalyst is trifluoromethane sulfonic acid.

6. The process of claim 1 wherein the mixture has an APHA value of less than 150.

7. The process of claim 1 wherein the 2,6-distyrenated-p-cresol is present in a concentration of 75% minimum by GC area, based on the total area of the monostyrenated-p-cresol, distyrenated-p-cresol, and tristyrenated-p-cresol.

8. The process of claim 1 wherein the 2,6-distyrenated-p-cresol is present in a concentration of from about 80 to about 95% by GC area, based on the total area of the monostyrenated-p-cresol, distyrenated-p-cresol, and tristyrenated-p-cresol.

9. The process of claim 8 wherein the monostyrenated-p-cresol and tristyrenated-p-cresol are each present in a concentration in the range of from about 1 to about 15% by GC area based on the total area of the monostyrenated-p-cresol, distyrenated-p-cresol, and tristyrenated-p-cresol.

10. The process of claim 9 wherein the GC area percentage of the combination of the monostyrenated-p-cresol and tristyrenated-p-cresol components will be in the range of from about 5 to about 30 percent by area, based on the total area of the monostyrenated-p-cresol, distyrenated-p-cresol, and tristyrenated-p-cresol.

11. A method for stabilizing a polymeric composition comprising including in said composition an effective amount of a mixture of styrenated p-cresol species that is liquid at room temperature and has a viscosity of less than 40,000 cps at 25° C., wherein said mixture is prepared by a process yielding 2,6-distyryl-p-cresol with an assay of 70% minimum by GC area and comprises reacting styrene with p-cresol at a molar ratio of 1.85 to 2.1:1, respectively, in the presence of an acid catalyst at a temperature ranging from about 40° C. to about 150° C., wherein said mixture comprises monostyrenated p-cresol, distyrenated-p-cresol, and tristyrenated p-cresol and exhibits an acid number of less than 0.1 mg KOH/gram.

12. The method of claim 11 wherein the distyrenated-p-cresol is present in a concentration of 75% minimum by GC area, based on the total area of the monostyrenated-p-cresol, distyrenated-p-cresol, and tristyrenated-p-cresol.

13. The method of claim 11 wherein the polymeric composition comprises a polyol or a polyurethane and the stabilized composition exhibits low fog.

14. The method of claim 11 wherein the distyrenated-p-cresol is present in a concentration of from about 80 to about 95% by GC area, based on the total area of the monostyrenated-p-cresol, distyrenated-p-cresol, and tristyrenated-p-cresol.

15. The method of claim 14 wherein the monostyrenated-p-cresol and tristyrenated-p-cresol are each present in a concentration in the range of from about 1 to about 15% by GC area based on the total area of the monostyrenated-p-cresol, distyrenated-p-cresol, and tristyrenated-p-cresol.

16. The method of claim 15 wherein the GC area percentage of the combination of the monostyrenated-p-cresol and tristyrenated-p-cresol components will be in the range of from about 5 to about 30 percent by area, based on the total area of the monostyrenated-p-cresol, distyrenated-p-cresol, and tristyrenated-p-cresol.

17. The method of claim 11 wherein the composition further comprises a co-stabilizer.

18. The method of claim 17 wherein the polymer is selected from the group consisting of polyolefins, PVC, polyurethanes, polyols, and elastomers.

19. The method of claim 18 wherein the elastomer is styrene-butadiene rubber.

20. The method of claim 17 wherein the co-stabilizer is selected from the group consisting of phenolics, phosphites, diaryl amines, and epoxidized vegetable oils.

21. The method of claim 20 wherein the co-stabilizer is an organophosphite.

22. The method of claim 20 wherein the co-stabilizer is a dialkylated diphenylamine.

23. The method of claim 20 wherein the co-stabilizer is co-stabilizer is epoxidized soybean oil.

24. The method of claim 21 wherein the organophosphite is tris(nonylphenyl)phosphite.

25. A composition comprising a mixture of styrenated p-cresol species that is liquid at room temperature, has a viscosity of less than 40,000 cps at 25° C., comprising 2,6-distyrenated p-cresol assaying at 70% minimum by GC area percent prepared by a process comprising reacting styrene with p-cresol at a molar ratio of 1.85 to 2.1:1, respectively, in the presence of an acid catalyst at a temperature ranging from about 40° C. to about 150° C., wherein said mixture comprises monostyrenated-p-cresol, distyrenated-p-cresol, and tristyrenated-p-cresol and exhibits an acid number of less than 0.1 mg KOH/gram.

26. The composition of claim 25 wherein the mixture has an APHA value of less than 150.

27. The composition of claim 26 wherein the monostyrenated-p-cresol and tristyrenated-p-cresol are each present in a concentration in the range of from about 1 to about 15% by GC area based on the total area of the monostyrenated-p-cresol, distyrenated-p-cresol, and tristyrenated-p-cresol and the acid number is less than 0.01 mg KOH/gram.

* * * * *